United States Patent Office 2,921,050
Patented Jan. 12, 1960

2,921,050

PREPARATION AND USE OF HALOHYDRIN ETHER-AMINE CONDENSATES

William J. Belanger, Louisville, Ky., assignor to Devoe & Raynolds Co., Inc., a corporation of New York No Drawing. Application December 24, 1956
Serial No. 630,027

10 Claims. (Cl. 260—47)

This invention, in one of its aspects, pertains to halohydrin ether-amine condensates. In other of its aspects, the invention relates to both monomeric and polymeric condensates having a variety of industrial applications. In another aspect, this invention pertains to the curing of epoxide resins, for example, glycidyl polyethers having 1,2-epoxy equivalencies greater than one. In still another of its aspects, the invention relates to useful resinous compositions having exceptional impact strengths and elongation characteristics.

Various groups of compounds having both amino and hydroxyl substituents are known. According to one embodiment of this invention, novel amine condensates are made, characterized by an amino group on one carbon atom and a hydroxyl substituent on an adjacent carbon atom separated from at least one other amino group and adjacent hydroxyl substituent by plurality of carbon atoms. The invention contemplates the reaction of a polyalcohol and at least one epihalohydrin to form a halohydrin ether or a polyhalohydrin ether and the condensation of the halohydrin ether thus formed with ammonia or an amine, accompanied by neutralization, to form a condensate, the amine having at least two amino hydrogen atoms. From a polyhalohydrin ether, a condensate having a plurality of separated amine-hydroxyl substituents is formed. Since in the preparation of these condensates all of the nitrogen containing compounds used except ammonia are amines, the reaction product is termed a halohydrin ether-amine condensate.

In the preparation of the halohydrin ether, which forms condensates of this invention, it is normally desirable to employ one mol of epihalohydrin for each hydroxyl group in the polyalcohol. Nevertheless, in the case of alcohols having two or more hydroxyl groups the epihalohydrin can be used in an amount less than the number of hydroxyl groups, as will be seen. It is particularly desirable to use less than one mol of epihalohydrin per hydroxyl of polyalcohol in the case of glycerin. Since secondary alcoholic hydroxyls are much less reactive with epihalohydrin than primary alcoholic hydroxyls two mols of epihalohydrin per mol of glycerin are sufficient. Hence, in most instances, epihalohydrin is reacted with the polyhydric alcohol in a ratio of one mol of epihalohydrin per primary hydroxyl group.

The reaction of the polyhydric compound with epihalohydrin involves no particular difficulties. However, the reaction is exothermic and the temperature should not be permitted to rise too high or too rapidly, the temperature generally being kept below 85° C. to 90° C. by rate of addition of reactants or by cooling if necessary. The condensation of the polyalcohol with epihalohydrin to form the polyhalohydrin ether is generally acid catalyzed, a preferred catalyst being a $BF_3$ complex. Others can be used, of course, as will be discussed.

To form the halohydrin ether-amine condensate, the polyhalohydrin ether is usually heated with the particular amine at a temperature of, say, 115° C. to 135° C. The halohydrin ether is added to the amine, the exotherm of the reaction being controlled by the rate of addition. In the reaction of the amine with the polyhalohydrin ether an amine-hydrohalide salt is formed. This amine salt is then subsequently reacted with an inorganic alkali to liberate the hydrogen halide. Suitable alkalies are oxides or hydroxides of alkali or alkaline earth metals, for example, calcium oxide, sodium hydroxide, calcium hydroxide, potassium hydroxide, etc., and one mol of alkali per halohydrin group is generally used. Instead of adding alkali after the halohydrin ether and amine have reacted, a desirable method is to add alkali after about half of the halohydrin ether has been added to the amine. As the halohydrin ether and amine react, the product becomes quite viscous due to the formation of the amine-hydrohalide salt. Since the halohydrin ether-amine condensate is less viscous than the amine-hydrohalide salt, the addition of alkali before the reaction is complete renders the mixture less viscous. The reaction can thus more readily be carried to completion. It is generally convenient to use dilute alkali, for example, a forty percent aqueous solution, the addition of alkali being continued after the condensate is formed. Desirably, when all of the halohydrin has been added, about half of the alkali to be used has been added. Thus, the alkali can be added before or after completion of the reaction. After the addition of alkali, water is usually removed by distillation. The product can also be extracted with a suitable organic solvent and dried.

In the reaction of the polyhalohydrin ether and the amine, the proportions of reactants vary depending upon whether the monomeric halohydrin ether-amine condensate or the polymeric halohydrin ether-amine condensate is desired. In the preparation of monomeric halohydrin ether-amine condensate products, one mol of the amine is employed per halogen atom of the polyhalohydrin ether. Thus, in the case of dihalohydrin ethers, two mols of amine are employed, resulting in a product having two terminal amine substituents. In the case of four alcoholic hydroxyl polyalcohols, four mols of amine yield a monomeric reaction product. If polymeric reaction products are desired, the amine and a dihalohydrin ether are employed, their ratio being less than one mol of amine per halogen atom of the dihalohydrin ether. Valuable polymeric products are obtained using between about 0.55 and 1 mol of amine per halogen atom. Less than 0.52 mol amine per halogen atom generally results in a cross-linked product. Particularly desirable polymeric products are obtained using 0.6 to 0.8 mol of amine per halogen of the halohydrin ether. It is understood that if the polyhalohydrin ether contains more than two halohydrin ether groups, and if less than one mol of amine per halogen atom is used, cross-linked polymers result.

Halohydrin ethers with which this invention is concerned are generally prepared from polyalcohols by the use of an epihalohydrin, the process being well known. Preferred epihalohydrins are the chloro compounds such as epichlorhydrin. Other halohydrins are epibromhydrin and epiiodohydrin. As aforenoted, condensation catalysts are used in reacting an epihalohydrin with a polyalcohol for the formation of a polyhalohydrin ether. Typical catalysts are those of the Friedel-Crafts type, including anhydrous $AlCl_3$, $BF_3$, $FeCl_3$, $ZnCl_2$, $SnCl_4$, and complexes such as the well known $BF_3$ etherates, etc.; acid type catalysts including HF, $H_2SO_4$, $H_3PO_4$, and the like. Concentration of the catalysts may be varied from 0.1 percent to 2 percent depending upon the individual catalysts.

As indicated, besides ammonia, amines having at least two active amino hydrogen atoms are used in the practice of an aspect of this invention. Included are primary monoamines, that is, amines having only one $NH_2$ group, such as methyl amine, ethyl amine, propyl amine, octyl amine, allyl amine, aniline, toluidine, xylidine and the like. Also included are polyamines, including diamines, i.e., amines having two or more primary or secondary amino groups on separate carbon atoms, for example, ethylene diamine, propylene diamine, hexamethylene diamine, trimethylene diamine, tetramethylene diamine, tetramethylene pentamine, diethylene triamine, bisiminopropyl amine, the phenylene diamines, metaxylylene diamine, metatolylene diamine, etc. Heterocyclic amines, such as amino pyridine, amino triazine, etc., and substituted amines, for example, hydroxy ethyl ethylene diamine, hydroxy propyl ethylene diamine, etc.

The alcohols employed in the preparation of the polyhalohydrin ethers are polyalcohols. It is understood that the term "polyalcohol" includes both alcohols and glycol ethers, each having more than one alcoholic hydroxyl substituent. Suitable polyalcohols are glycerol, which in this invention functions as a dihydric alcohol, 1,3-propylene glycol, ethylene glycol, trimethylene glycol, 1,4-butanediol, 2-ethyl-hexanediol-1,6, triethylene glycol, decamethylene glycol, hexamethylene glycol, the polytetramethylene glycols, diethylene glycol, trimethylol propane, pentaerythritol, mannitol, arabitol, etc. An especially desirable class of polyalcohols, particularly where halohydrin ether-amine condensates are to be used in the curing of epoxide resins, is the high molecular weight polyoxyalkylene glycols or "Carbowaxes." Included are Carbowax 300, Carbowax 400, Carbowax 600, Carbowax 800, Carbowax 1000, Carbowax 1500, Carbowax 2000, Carbowax 3000, and Carbowax 4000, the "Carbowaxes" being mixtures of polyoxyalkylene glycols, the number indicating the approximate average molecular weight.

The preparation of the halohydrine ether-amine condensates of this invention is best illustrated by the following examples, which, of course, are illustrative only. By equivalent weight of the hydroxy substituted amine is meant the weight of the amine per amino hydrogen, i.e., per active hydrogen. For example, the equivalent weight of a primary amine would be the molecular weight divided by two.

EXAMPLE 1

Into a five hundred ml., three necked flask, equipped with an agitator, condenser, thermometer and dropping funnel, are charged 104.0 parts by weight (one mol) of 1,5-pentanediol, 1 cc. of an ether solution of boron trifluoride, and twenty parts by weight of epichlorhydrin, to prepare the dichlorhydrin ether of 1,5-pentanediol. The reaction mixture is heated to 75° C. over a period of approximately twenty-five minutes, whereupon an additional 165.0 parts by weight (total of two mols) of epichlorhydrin are added gradually by means of the dropping funnel over a period of about ten minutes. The temperature of the reaction mixture is maintained at about 75° C., by cooling if necessary. After the exotherm of the reaction subsides, the product containing the dichlorhydrin ether is cooled to room temperature. The dichlorhydrin ether is reacted with an amine in a one liter flask, equipped with an agitator, condenser, thermometer and two dropping funnels. Two mols of tetraethylene pentamine (378.0 parts by weight) are heated to 120° C., whereupon approximately half of the dichlorhydrin ether prepared in the preceding paragraph is added. An exothermic reaction results and the reaction mixture is cooled, if necessary, to maintain reaction temperature between 120° C. and 125° C. After the exotherm subsides, the reaction mixture is heated to 120° C., whereupon the remainder of the dichlorhydrin ether and a solution of eighty parts by weight of sodium hydroxide (two moles) in 120.0 parts by weight of water are added by means of the dropping funnels at such a rate that when all of the dichlorhydrin ether has been added, approximately half of the alkali has been added, the exotherm of the reaction being controlled by the rate of addition. The aqueous sodium hydroxide is introduced to convert the amine hydrochloride formed to sodium chloride and amine. The addition of alkali is continued until completion, approximately one hour, after which heating is discontinued and the flask contents are cooled to room temperature. Toluene is added to the reaction mixture, the flask is set up for distillation with a water separating distillation head, and the water is distilled off as an azeotropic mixture. After the removal of the water, the remaining mixture is cooled and filtered to remove the sodium chloride formed in the reaction and the toluene is distilled off at reduced pressure, the halohydrin ether-amine condensate, obtained in a ninety-eight percent yield, has a melting point of 17° C. (Durrans' Mercury Method), a nitrogen content of 21.9 percent and a theoretical equivalent weight of forty-nine.

EXAMPLE 2

From 205.8 grams (0.5 mol) of a trichlorhydrin ether of a trimethylol propane resulting from the reaction of sixty-seven parts by weight (0.5 mol) of the trimethylol propane (having a molecular weight of 134) with 138.75 parts by weight (1.5 mol) of epichlorhydrin, as in Example 1, a chlorhydrin ether-amine condensate is prepared following Example 1, using 154.5 parts by weight (1.5 mol) of diethylene triamine and sixty parts by weight (1.5 mol) of sodium hydroxide. The chlorhydrin ether-amine condensate in this particular case is insoluble in cold toluene, therefore, after azeotroping off the water with the aid of toluene, the remaining toluene is distilled off at atmospheric pressure to a pot temperature of 155° C. The chlorhydrin ether-amine condensate is then dissolved in n-butanol, is cooled and filtered. The butanol is distilled off until a solution of fifty-three percent nonvolatile content results, the nonvolatile content being determined by heating at 150° C. for one hour. The yield of the chlorhydrin ether-amine condensate (based on the nonvolatile solids content) is 95.8 percent, the viscosity of the fifty-three percent nonvolatile solution in butanol is $Z_1$ to $Z_2$ (Gardner-Holdt), the nitrogen content is 20.1 percent (based on the solids), and the theoretical equivalent weight is 50.7.

EXAMPLE 3

From 277 grams (one mol) of a dichlorhydrin ether of glycerin resulting from the reaction of ninety-two parts by weight (one mol) of glycerin (molecular weight ninety-two) with 185 parts by weight (two mols) of epichlorhydrin as in Example 1, a chlorhydrin ether-amine condensate is prepared following Example 1 using 378 parts by weight (two mols) of tetraethylene pentamine and eighty parts by weight (two mols) of sodium hydroxide. The chlorhydrin ether-amine condensate is obtained in a 96.4 percent yield, has a nitrogen content of nineteen percent, a melting point of 23° C. (Durrans' Mercury Method) and a theoretical equivalent weight of 48.5.

EXAMPLE 4

From 485 grams (one mol) of a dichlorhydrin ether of a polyethylene glycol resulting from the reaction of three hundred parts by weight (one mol) of the glycol (having a molecular weight of three hundred) with 185 parts by weight (two mols) of epichlorhydrin as in Example 1, a chlorhydrin ether-amine condensate is prepared following Example 1 using three hundred parts by weight (two mols) of concentrated ammonium hydroxide and eighty parts by weight (two mols) of sodium hydroxide. The chlorhydrin ether-amine condensate has a nitrogen content of 3.25 percent.

EXAMPLE 5

From 485 grams (one mol) of a dichlorhydrin ether of a polyethylene glycol resulting from the reaction of three hundred parts by weight (one mol) of the glycol (having a molecular weight of three hundred) with 185 parts by weight (two mols) of epichlorhydrin as in Example 1, a chlorhydrin ether-amine condensate is prepared following Example 1 using 378 parts by weight (two mols) of tetraethylene pentamine and eighty parts by weight (two mols) of sodium hydroxide. The chlorhydrin ether-amine condensate is obtained in a 92.8 percent yield, has a nitrogen content of 15.59 percent, a viscosity of $Z_6$ (Gardner-Holdt) and a theoretical equivalent weight of sixty-six.

EXAMPLE 6

From 585 grams (one mol) of a dichlorhydrin ether of a polyethylene glycol resulting from the reaction of four hundred parts by weight (one mol) of the glycol (having a molecular weight of four hundred) with 185 parts by weight (two mols) of epichlorhydrin as in Example 1, a chlorhydrin ether-amine condensate is prepared following Example 1 using 272 parts by weight (two mols) of metaxylylene diamine and eighty parts by weight (two mols) of sodium hydroxide. The chlorhydrin ether-amine condensate is obtained in a ninety percent yield, has a nitrogen content of 7.69 percent, a viscosity of $Z_4$ (Gardner-Holdt) and a theoretical equivalent weight of 131.

EXAMPLE 7

From 585 grams (one mol) of a dichlorhydrin ether of a polyethylene glycol resulting from the reaction of four hundred parts by weight (one mol) of the glycol (having a molecular weight of four hundred) with 185 parts by weight (two mols) of epichlorhydrin as in Example 1, a chlorhydrin ether-amine condensate is prepared following Example 1 using 232 parts by weight (two mols) of hexamethylene diamine employed as a seventy-two percent aqueous solution and eighty parts by weight (two mols) of sodium hydroxide. The chlorhydrin ether-amine condensate is obtained in an 89.7 percent yield, has a nitrogen content of 7.85 percent, a viscosity of Y (Gardner-Holdt) and a theoretical equivalent weight of 124.

EXAMPLE 8

One mol of polyethylene glycol having a molecular weight of five hundred is prepared by mixing three hundred parts by weight (0.5 mol) of polyethylene glycol having a molecular weight of six hundred with two hundred parts by weight (0.5 mol) of a polyethylene glycol having a molecular weight of four hundred. From a dichlorhydrin ether of this glycol mixture, prepared by reacting five hundred parts by weight of the glycol mixture with 185 parts by weight (two mols) of epichlorhydrin in accordance with Example 1, a chlorhydrin ether-amine condensate is prepared using 685 parts by weight (one mol) of the dichlorhydrin ether, 206 parts by weight (two mols) of diethylene triamine and eighty parts by weight (two mols) of sodium hydroxide as described in Example 1. The halohydrin ether-amine condensate is obtained in a ninety percent yield, has a nitrogen content of 8.7 percent, a viscosity of $Z_2$ to $Z_3$ (Gardner-Holdt) and a theoretical equivalent weight of 102.

EXAMPLE 9

From 785 grams (one mol) of a dichlorhydrin ether of a polyethylene glycol resulting from the reaction of six hundred parts by weight (one mol) of the glycol (having a molecular weight of six hundred) with 185 parts by weight (two mols) of epichlorhydrin as in Example 1, a chlorhydrin ether-amine condensate is prepared following Example 1 using 232 parts by weight (two mols) of hexamethylene diamine employed as a seventy-two percent aqueous solution and eighty parts by weight (two mols) of sodium hydroxide. The chlorhydrin ether-amine condensate is obtained in a 90.9 percent yield, has a nitrogen content of 6.43 percent, a viscosity of X to Y (Gardner-Holdt), and a theoretical equivalent weight of 157.

EXAMPLE 10

One mol of a polyethylene glycol having a molecular weight of eight hundred is prepared by mixing three hundred parts by weight (0.5 mol) of a polyethylene glycol having a molecular weight of six hundred with five hundred parts by weight (0.5 mol) of a polyethylene glycol having a molecular weight of one thousand. From a dichlorhydrin ether of this glycol mixture prepared by reacting four hundred parts by weight (0.5 mol) of the glycol with 92.5 parts by weight (one mol) of epichlorhydrin in accordance with Example 1, a chlorhydrin ether-amine condensate is prepared using 492.5 parts by weight (0.5 mol) of the dichlorhydrin ether, 108 parts by weight (one mol) of metaphenylene diamine and forty parts by weight (one mol) of sodium hydroxide as described in Example 1. The halohydrin ether-amine condensate is obtained in a ninety-one percent yield, has a melting point of 14° C. (Durrans' Mercury Method), and a theoretical equivalent weight of 188.

EXAMPLE 11

From 592.5 grams (0.5 mol) of dichlorhydrin ether of a polyethylene glycol resulting from the reaction of five hundred parts by weight (0.5 mol) of the glycol (having a molecular weight of one thousand) with 92.5 parts by weight (one mol) of epichlorhydrin as in Example 1, a chlorhydrin ether-amine condensate is prepared following Example 1 using 189 parts by weight (one mol) of tetraethylene pentamine and forty parts by weight (one mol) of sodium hydroxide. The chlorhydrin ether-amine condensate is obtained in a 93.7 percent yield, has a nitrogen content of 7.75 percent, a melting point of 34° C. (Durrans' Mercury Method) and a theoretical equivalent weight of 124.

EXAMPLE 12

From 448.2 grams (0.26 mol) of a dichlorhydrin ether of a polyethylene glycol resulting from the reaction of four hundred parts by weight (0.26 mol) of the glycol (having a molecular weight of 1540) with 48.2 parts by weight (0.52 mol) of epichlorhydrin as in Example 1, a chlorhydrin ether-amine condensate is prepared following Example 1, using 98.5 parts by weight (0.52 mol) of tetraethylene pentamine and 20.8 parts by weight (0.52 mol) of sodium hydroxide. The chlorhydrin ether-amine condensate is obtained in a 92.2 percent yield, has a nitrogen content of 5.7 percent, a melting point of 39° C. (Durrans' Mercury Method) and a theoretical equivalent weight of 149.

EXAMPLE 13

From 318.5 grams (0.1 mol) of a dichlorhydrin ether of a polytetramethylene glycol resulting from the reaction of three hundred parts by weight (0.1 mol) of the glycol (having a molecular weight of three thousand) with 18.5 parts by weight (0.2 mol) of epichlorhydrin as in Example 1, a chlorhydrin ether-amine condensate is prepared following Example 1, using 21.6 parts by weight (0.2 mol) of metaphenylene diamine and eight parts by weight (0.2 mol) of sodium hydroxide. The chlorhydrin ether-amine condensate is obtained in an 84.5 percent yield, and has a theoretical equivalent weight of 555.

EXAMPLE 14

From 335 grams (one mol) of a dichlorhydrin ether of triethylene glycol resulting from the reaction of 150 parts by weight (one mol) of the triethylene glycol (having a molecular weight of 150) with 185 parts by weight (two mols) of epichlorhydrin as in Example 1, a chlorhydrin ether-amine condensate is prepared following Example 1, using 378 parts by weight (two mols) of tetraethylene pentamine and eighty parts by weight (two mols) of sodium hydroxide. The chlorhydrin ether-amine condensate has a nitrogen content of 17.2 percent, a melting point of 10° C. (Durrans' Mercury Method) and a theoretical equivalent weight of 53.

The foregoing examples illustrate the preparation of monomeric condensates. As indicated hereinbefore, both monomeric and polymeric halohydrin ether-amine condensates are within the contemplation of this invention. The following examples illustrate the preparation of polymeric halohydrin ether-amine condensates made by using less than one mol of amine per halogen of the polyhalohydrin ether.

EXAMPLE 15

From 289 grams (one mol) of a dichlorhydrin ether of 1,5-pentanediol resulting from the reaction of 104 parts by weight (one mol) of 1,5-pentanediol (having a molecular weight of 104) with 185 parts by weight (two mols) of epichlorhydrin as in Example 1, a chlorhydrin ether-amine condensate is prepared following Example 1, using 170 parts by weight (1.25 mols) of metaxylylene diamine and eighty parts by weight (two mols) of sodium hydroxide. The polymeric chlorhydrin ether-amine condensate is obtained in a ninety-one percent yield, has a nitrogen content of 9.5 percent, a melting point of 23° C. (Durrans' Mercury Method) and a theoretical equivalent weight of 129.

EXAMPLE 16

From 289 grams (one mol) of a dichlorhydrin ether of 1,5-pentanediol resulting from the reaction of 104 parts by weight (one mol) of 1,5-pentanediol (molecular weight 104) with 185 parts by weight (two mols) of epichlorhydrin as in Example 1, a chlorhydrin ether-amine condensate is prepared following Example 1, using 150 parts by weight (1.10 mols) of metaxylylene diamine and eighty parts by weight (two mols) of sodium hydroxide. The polymeric chlorhydrin ether-amine condensate is obtained in a seventy-nine percent yield, has a nitrogen content of 9.68 percent, a melting point of 34° C. (Durrans' Mercury Method) and a theoretical equivalent weight of 152.5.

EXAMPLE 17

From 289 grams (one mol) of a dichlorhydrin ether of 1,5-pentanediol resulting from the reaction of 104 parts by weight (on mol) of the 1,5-pentanediol with 185 parts by weight (two mols) of epichlorhydrin as in Example 1, a chlorhydrin ether-amine condensate is prepared following Example 1, using 102.5 parts by weight (1.10 mols) of aniline and eighty parts by weight (two mols) of sodium hydroxide. The polymeric chlorhydrin ether-amine condensate is obtained in a ninety-three percent yield, has a melting point of 22° C. (Durrans' Mercury Method) and a theoretical equivalent weight of 1,812.

As indicated hereinbefore, the halohydrin ether-amine condensates of this invention are eminently suitable as cross-linking agents for epoxide resins. Moreover, resulting cured compositions have extremely good elongation and impact properties, particularly when the halohydrin ether-amine condensate is derived from a high molecular weight dihydric alcohol such as the polyoxyethylene glycols. In other words, when the halohydrin ether is made from a low molecular weight dihydric alcohol such as pentanediol, the resulting cured polyepoxide, regardless of the polyepoxide used, will be harder than the same polyepoxide cured with a halohydrin ether-amine condensate in which the halohydrin was derived from a high molecular weight dihydric alcohol such as one of the polyglycols. Epoxide resins cured with any of the halohydrin ether-amine condensates of this invention are useful in the manufacture of films, articles, molded products, laminates and the like. A particularly important aspect of the invention is that cured compositions of unusually outstanding properties are obtained when a polyepoxide is cross-linked with an amine-halohydrin ether condensate wherein the halohydrin ether is derived from a polyalcohol having a molecular weight of at least three hundred. When a halohydrin ether is made from a high molecular weight polyalcohol, for example, polyethylene glycols having molecular weights of three hundred, four hundred, five hundred, six hundred, two thousand, etc., a whole new class of unusual cross-linking agents for polyepoxides is obtained.

More specifically, the physical properties of the cured composition depend upon both the structure of the epoxide resin and the structure of the halohydrin ether-amine condensate. Thus, while more flexible products are obtained from halohydrin ether-amine condensates wherein the halohydrin is derived from a high molecular weight alcohol, the properties of the cured resin also depend on the particular amine used in the halohydrin ether-amine condensate. In order to obtain products having a high degree of flexibility using aromatic amines such as metaphenylene diamine it is desirable that the alcohol employed in the preparation of the halohydrin have a molecular weight of at least six hundred and preferably eight hundred. On the other hand, when aliphatic amines such as diethylene triamine, tetraethylene pentamine, and the like, are used in the preparation of the halohydrin ether-amine condensate, flexible resins are obtained using alcohols having molecular weights in the four hundred to five hundred range.

Another feature of operation in accordance with this invention is that the physical properties of the cured epoxide resins can be varied by the use of long and short chain halohydrin ether-amine condensates or, if desired, combination of halohydrin ether-amine condensates with conventional amines. For example, if the cured resin obtained by curing a particular epoxide resin with a long chain halohydrin ether-amine condensate is too flexible for a particular application, it is possible to use in lieu of a portion of the amine condensate, a short chain amine such as tetraethylene pentamine, diethylene triamine, etc. This is of considerable commercial importance since by the use of one epoxide resin and two amine curing agents it is possible to obtain cured products ranging from hard and rigid, to soft and flexible. The halohydrin ether-amine condensate and the known or conventional amine, when combined are used as a converter in a ratio of from 0.03 to 6 parts by weight of the known amine per part of halohydrin ether-amine condensate, the combination of the two being employed in the same amount as if the halohydrin ether-amine condensate were used by itself, that is, in a range of from 0.5 to 1.5 amine equivalent per epoxide group, as indicated hereinafter.

Also influencing the physical properties of the cured resin is the composition of the glycidyl polyether. For example, the use of butyl glycidyl ether or other heat distortion lowering reactants in combination with the glycidyl polyether and with a particular halohydrin ether-amine condensate is exceedingly important in applications for desired flexibility, and a high degree of water resistance. Excellent compositions result from the cross-linking with the curing agents of this invention of epoxide resins in admixture with lower viscosity monoepoxides, such as a mixture of a glycidyl polyether of a polyhydric phenol and butyl glycidyl ether. Polysulfide resins containing terminal SH groups can also be used with the glycidyl polyethers. A further advantage of this invention is that halohydrin ether-amine condensates employed as curing agents can be derived not only from polyalcohols but from monohydric alcohols as well, such as butanol, propanol, hexanol, lauryl alcohol, etc.

Still another advantage of the use of halohydrin ether-amine condensates of this invention, particularly those derived from polyalcohols having molecular weights of over three hundred, is to decrease the tensile strength and tensile modulus, and to increase the tensile elongation and impact strength. Another effect of the use of halohydrin ether-amine condensates derived from polyalcohols having molecular weights of over three hundred is that cured compositions exhibit better adhesion than epoxide compositions cured with conventional amines.

To exemplify the curing of epoxide compositions cured in accordance with this invention, and to illustrate some of the outstanding properties of resulting cured compositions, the following examples are included. Cured films are prepared with epoxide resins using the halohydrin ether-amine condensates of the preceding examples and various epoxide resins.

EXAMPLE 18

The epoxide resin used in the preparation of cured films of this example is the result of reacting 650 parts by weight (2.85 mols) of Bisphenol A with 414 parts by weight (4.48 mols) of epichlorhydrin and an aqueous solution of 218 parts by weight (5.45 mols) of sodium hydroxide. The resin is washed and dried resulting in an epoxide resin with a melting point of 70° C. (Durrans' Mercury Method), with a weight per epoxide of 475. From five hundred parts by weight of this epoxide resin, 250 parts by weight of xylene, 250 parts by weight of 2-ethoxy ethanol, and twenty-five parts by weight of a butylated urea-formaldehyde resin (U-F resin) having a viscosity of S to V (Gardner-Holdt), a solids content of sixty percent (in 87½ percent butyl alcohol and 12½ percent xylene), and a naphtha tolerance of 350, an epoxide containing resinous solution is prepared. To twenty parts by weight of this resinous solution are added two parts by weight of the halohydrin ether-amine condensate of Example 1. A film of the resulting solution is drawn down on a glass plate with a three mil blade and is cured by baking at 180° C. for fifteen minutes, resulting in a tough, flexible film having good mar resistance. A cured film, prepared on a tin panel, passes a twenty-eight inch-pound bump test.

EXAMPLE 19

A film is prepared by combining with twenty parts by weight of the U-F containing epoxide resin solution of Example 18, two parts by weight of the fifty-three percent nonvolatile solution of the halohydrin ether-amine condensate of Example 2. A film of the resulting solution is drawn down on a glass plate with a three mil blade and is cured by baking at 180° C. for fifteen minutes. The cured film possesses excellent hardness, flexibility, adhesion and mar resistance. A cured film, prepared on a tin plate, passes a twenty-eight inch-pound bump test.

EXAMPLE 20

From a solution prepared from twenty parts by weight of the U-F containing epoxide resin solution of Example 18 and 1.40 parts by weight of the halohydrin ether-amine condensate of Example 5, a film is drawn down on a glass plate with a three mil blade and is cured by baking at 180° C. for fifteen minutes. The resulting well cured film has excellent hardness, flexibility, adhesion and mar resistance. A cured film, prepared on a tin panel, passes a twenty-eight inch pound bump test.

EXAMPLE 21

From twenty parts by weight of the U-F containing epoxide resin solution of Example 18 and 2.60 parts by weight of the halohydrin ether-amine condensate of Example 6 (employed as a fifty percent solution in 2-ethoxy ethanol) a resinous solution is prepared and is drawn down on a glass plate with a three mil blade and is cured by baking at 180° C. for fifteen minutes. The resulting well cured film has excellent hardness, mar resistance, adhesion and flexibility. A cured film, prepared on a tin panel, passes a twenty-eight inch pound bump test.

Another three mil film is prepared on a glass panel from twenty parts by weight of the epoxide resin solution of Example 18 and 5.2 parts by weight of the halohydrin ether-amine condensate of Example 6 (employed as a fifty percent solution in 2-ethoxy ethanol) and is cured by baking at 180° C. for fifteen minutes. The well cured film obtained has excellent hardness, mar resistance, adhesion and flexibility. A cured film, prepared on a tin panel, passes a twenty-eight inch pound bump test.

EXAMPLE 22

From twenty parts by weight of the U-F containing epoxide resin solution of Example 18 and 2.62 parts by weight of the halohydrin ether-amine condensate of Example 7 (employed as a fifty percent solution in 2-ethoxy ethanol), a film is drawn down on a glass plate with a three mil blade and is baked at 180° C. for fifteen minutes. The resulting film is well cured and possesses excellent hardness, flexibility, adhesion and mar resistance. A cured film, prepared on a tin panel, passes a twenty-eight inch pound bump test and when the bumped panel is boiled in water for fifteen minutes, no loss of adhesion results.

EXAMPLE 23

A film is prepared by combining twenty parts by weight of the U-F containing epoxide resin solution of Example 18 and 3.30 parts by weight of the halohydrin ether-amine condensate of Example 9 (employed as a fifty percent solution in 2-ethoxy ethanol), and is drawn down on a glass plate with a three mil blade. The film is baked for fifteen minutes at 180° C. resulting in a well cured, hard flexible film having good mar resistance and adhesion. A cured film, prepared on a tin plate, passes a twenty-eight inch pound bump test.

EXAMPLE 24

From a solution of twenty parts by weight of the U-F containing epoxide resin solution of Example 18 and 3.05 parts by weight of the halohydrin ether-amine condensate of Example 16 (employed as a fifty percent solution in 2-ethoxy ethanol) a film is drawn down on a glass plate with a three mil blade and is cured by baking at 180° C. for fifteen minutes. The resulting film is well cured, tough and extremely flexible and has good mar resistance and adhesion. A cured film, prepared on a tin panel, passes a twenty-eight inch pound bump test.

EXAMPLE 25

From a solution of twenty parts by weight of the U-F containing epoxide resin solution of Example 18 and 2.60 parts by weight of the halohydrin ether-amine condensate of Example 15 (employed as a fifty percent solution in 2-ethoxy ethanol), a film is drawn down on a glass plate with a three mil blade and is cured by baking for fifteen minutes at 180° C. The resulting film is well cured, tough, flexible and has good adhesion and mar resistance. A cured film, prepared on a tin panel, passes a twenty-eight inch pound bump test.

EXAMPLE 26

An epoxide resin is prepared by reacting four mols of Bisphenol A, five mols of epichlorhydrin and 6.43 mols of sodium hydroxide (ten percent aqueous solution). The product is washed and dried. The resulting epoxide resin (one hundred parts by weight) is heated with an additional five parts by weight of Bisphenol A, resulting in an epoxide resin with a weight per epoxide of 1800. A solution of the epoxide resin is prepared from four hundred parts by weight of the epoxide resin, three hundred parts by weight of xylene and three hundred parts by weight of 2-ethoxy ethanol.

From a solution of twenty-five parts by weight of the epoxide resin solution of this example and one part by weight of the halohydrin ether-amine condensate of Example 14, a film is drawn down on a glass plate with a three mil blade and is cured at room temperature for sixteen hours, resulting in a well cured, tough, extremely flexible film with good mar resistance and adhesion.

EXAMPLE 27

An epoxide resin is prepared from four mols of Bisphenol A reacted with five mols of epichlorhydrin and 6.43 mols of sodium hydroxide (as a ten percent aqueous solution). The product is washed and dried, resulting in an epoxide resin with a weight per epoxide of 950.

An epoxide resin solution is prepared by combining five hundred parts by weight of this epoxide resin prepared in the preceding paragraph with 250 parts by weight of xylene and 250 parts by weight of 2-ethoxy ethanol. With twenty parts by weight of the resulting epoxide resin solution are combined 1.2 parts by weight of a halohydrin ether-amine condensate prepared as in Example 5, employing one mol of a polyethylene glycol (molecular weight three hundred) and two mols of metaxylylene diamine to prepare a solution which is drawn down to a film on a glass plate by means of a three mil blade. The film is baked for fifteen minutes at 180° C., whereby a well cured, tough, extremely flexible film is obtained, the film having good adhesion and mar resistance.

EXAMPLE 28

An epoxide resin is prepared by reacting 228 parts by weight (one mol) of Bisphenol A, 925 parts by weight (ten mols) of epichlorhydrin and eighty parts by weight (two mols) of sodium hydroxide. The water formed in the reaction and the excess epichlorhydrin are distilled off and the product is filtered. The resulting epoxide resin, a viscous liquid with a weight per epoxide of 190, will hereinafter be designated "Resin A."

Another epoxide containing product, with a weight per epoxide of 178, is made by combining eighty parts by weight of Resin A with twenty parts by weight of butyl glycidyl ether. This epoxide resin will hereinafter be termed "Resin B."

A cured composition is produced by combining in a suitable container, seventy-nine parts by weight of Resin A, seventy-nine parts by weight of Resin B, 31.5 parts by weight of a halohydrin ether-amine condensate, prepared according to the procedure of Example 1 from 278.8 grams (one mol) of the monochlorhydrin ether of lauryl alcohol reacted with 103.0 grams (one mol) of diethylene triamine and forty grams (one mol) of sodium hydroxide, and curing at room temperature for six days. The resulting casting has these physical properties:

Tensile strength—7,236 pounds per square inch
Flexural strength—13,093 pounds per square inch
Rockwell hardness M—73
Impact strength—0.53 foot pounds per inch of notch
Tensile elongation—8.1 percent

EXAMPLE 29

From the combination of 83.8 parts by weight of Resin A, 83.8 parts by weight of Resin B, 16.2 parts by weight of a halohydrin ether-amine condensate prepared as in Example 1 from 166.5 grams (one mol) of the monochlorhydrin ether of n-butyl alcohol, 189 grams (one mol) of tetraethylene pentamine and forty grams (one mol) of sodium hydroxide; and 16.2 parts by weight of tetraethylene pentamine. A casting is prepared by curing the mixture for six days at room temperature. The casting has these physical properties:

Tensile strength—9,179 pounds per square inch
Flexural strength—15,900 pounds per square inch
Rockwell hardness M—74
Impact strength—0.49 foot pound per inch of notch
Tensile elongation—6.5 percent.

Another composition of 77.5 parts by weight of Resin A, 77.5 parts by weight of Resin B, and forty-five parts by weight of the halohydrin ether-amine condensate described in the preceding paragraph is prepared and cured for six days at room temperature, resulting in a casting possessing these physical properties:

Tensile strength—7,746 pounds per square inch
Flexural strength—14,500 pounds per square inch
Rockwell hardness M—74
Tensile elongation—6 percent.

EXAMPLE 30

To prepare a casting, one hundred parts by weight of Resin A are combined with seventy-one parts by weight of a halohydrin ether-amine condensate, prepared as in Example 1 from 785 grams (one mol) of a dichlorhydrin ether of polyethylene glycol (molecular weight of six hundred) reacted with 103 grams (one mol) of diethylene triamine, 108 grams (one mol) of metaphenylene diamine and eighty grams (two mols) of sodium hydroxide; and cured at room temperature for sixteen hours followed by baking for two hours at 100° C. The resulting casting has the following physical properties:

Tensile strength—1,803 pounds per square inch
Rockwell hardness M— —43
Impact strength—1.85 foot pounds per inch of notch
Tensile elongation—51 percent.

Examples 18 through 30 illustrate the excellent properties obtained from films of solutions of epoxide resins and the halohydrin ether-amine condensates of this invention, with or without additional known amine curing agents. However, the most important aspect of this invention insofar as products are concerned is that castings having vastly improved flexibility, tensile elongation, and impact strength are obtained. Tensile strength, flexural strength, tensile elongation and hardness properties, as well as impact strength, of halohydrin amine-epoxide compositions are exemplified in the following table. Tensile and flexural strengths are recited in pounds per square inch, tensile elongation in percent, and impact strength in foot pounds per inch of notch. The figures given for hardness, unless preceded by an "S," indicate hardness on the Rockwell M scale. Hardness figures which are preceded by an "S" are Shore durometer hardness scale A determinations. All of the halohydrin ether-amine condensates used in the products set forth are monomeric amine condensates of dihalohydrin ethers prepared by reacting one mol of a dihalohydrin ether of a dihydric alcohol with two mols of an amine. The amine forming the condensate and the parts by weight of condensate used in conjunction with the epoxide are listed in the table under "condensate." In addition, for clarity, the dihalohydrin ether is identified by the alcohol from which it is derived. The epoxide resins, which in combination with halohydrin ether-amine condensates of this invention are cured in the form of castings are set forth in the table under the heading "epoxide." These resins are described in Example 28 and either Resin A of that example or a mixture of Resin A and Resin B as set forth in the example is used. The resins described in the table were cured at room temperature and post-cured for two hours at 100° C. While desirable cures are obtainable with the epoxide and the halohydrin ether-amine condensate by itself, in some cases a second curing agent, usually an amine, is employed. This curing agent and the amount in parts by weight are set forth in the table under "other curing agents." The amine used as an additional curing agent, as well as the amine which is reacted with the dihalohydrin ether to form the condensate, are both represented by initials, TEPA, for example, being tetraethylene pentamine. DETA is diethylene triamine, MXD is metaxylylene diamine, MPD is metaphenylene diamine, and HMD is hexamethylene diamine. PEG 600 represents polyethylene glycol having a molecular weight of six hundred, etc.

Table

| Condensate | | | Epoxide | | Other | | Properties | | | | |
|---|---|---|---|---|---|---|---|---|---|---|---|
| Total Parts | Dihalohydrin Ether of— | Amine | Parts Resin A | Parts Resin B | Curing Agent | Parts | Tensile Strength p.s.i. | Flexural Strength p.s.i. | Tensile Elongation, percent | Impact Strength, ft.lb./in. notch | Hardness |
| 16.2 | triethylene glycol | TEPA | 83.8 | 83.8 | TEPA | 16.2 | 9,220 | 16,900 | 4.8 | 0.52 | 75 |
| 16.0 | glycerin | TEPA | 84.0 | 84.0 | TEPA | 16.0 | 7,442 | 12,200 | 4.5 | 0.45 | 58 |
| 15.85 | 1,5-pentanediol | TEPA | 84.15 | 84.15 | TEPA | 15.85 | 9,597 | 15,800 | 6.6 | 0.62 | 79 |
| 42.0 | 1,5-pentanediol | TEPA | 79.0 | 79.0 | | | 5,563 | 7,700 | 17.5 | | 20 |
| 69.0 | PEG 400 | MXD | 50.0 | 50.0 | | | 2,344 | | 59.0 | 2.47 | −33 |
| 64.0 | PEG 400 | MPD | 50.0 | 50.0 | | | 9,019 | 15,500 | 12.0 | 1.40 | 77 |
| 47.5 | PEG 400 | DETA | 50.0 | 50.0 | | | 2,964 | | 30.0 | 1.47 | −3 |
| 90.0 | PEG 600 | Aniline | 50.0 | 50.0 | TEPA | 9.2 | 292 | | 30.0 | 0.93 | S 90 |
| 66.0 | PEG 600 | TEPA | 67.0 | 67.0 | | | 3,250 | 5,000 | 30.0 | | −20 |
| 18.5 | PEG 600 | TEPA | 81.5 | 81.5 | TEPA | 18.5 | 5,509 | 13,100 | 12.6 | 0.57 | 7 |
| 77.0 | PEG 600 | DETA | 61.5 | 61.5 | | | 1,015 | | 48.0 | 3.60 | S 95 |
| 33.75 | PEG 600 | DETA | 77.5 | 77.5 | DETA | 11.25 | 8,078 | 14,277 | 8.0 | 0.94 | 74 |
| 61.0 | PEG 600 | DETA | 100.0 | 0.0 | | | 4,974 | 8,318 | 13.0 | 0.94 | 33 |
| 86.0 | PEG 600 | MXD | 100.0 | 0.0 | | | 402 | | 43.0 | 11.9 | S 75 |
| 94.0 | PEG 600 | MXD | 53.0 | 53.0 | | | 548 | | 68.0 | 16.0 | |
| 48.0 | PEG 600 | MXD | 68.0 | 68.0 | MXD | 16.0 | 6,818 | 10,600 | 30.0 | −1.66 | 49 |
| 61.0 | PEG 600 | MXD | 64.0 | 64.0 | MXD | 11.0 | 1,248 | 669 | 115.0 | 2.05 | S 99 |
| 31.0 | PEG 600 | MXD | 74.0 | 74.0 | MXD | 21.0 | 9,047 | 15,837 | 7.4 | 0.98 | 71 |
| 24.0 | PEG 600 | MXD | 76.0 | 76.0 | MXD | 24.0 | 9,516 | 18,259 | 6.2 | 1.10 | 76 |
| 11.7 | PEG 600 | MXD | 80.5 | 80.5 | MXD | 27.3 | 10,042 | 17,915 | 7.7 | 1.12 | 80 |
| 5.2 | PEG 600 | MXD | 82.75 | 82.75 | MXD | 29.3 | 11,143 | 18,710 | 6.3 | 0.88 | 85 |
| 91.0 | PEG 600 | MPD | 54.5 | 54.5 | | | 2,650 | | 143.0 | 8.0 | −70 |
| 70.0 | PEG 600 | MPD | 50.0 | 50.0 | MPD | 2.35 | 2,903 | 4,900 | 74.0 | 2.63 | −40 |
| 60.0 | PEG 600 | MPD | 50.0 | 50.0 | MPD | 4.30 | 4,400 | 8,057 | 44.0 | 1.56 | 28 |
| 55.7 | PEG 600 | MPD | 67.1 | 67.1 | MPD | 10.0 | 9,414 | 15,826 | 10.3 | 0.94 | 81 |
| 44.25 | PEG 600 | MPD | 70.5 | 70.5 | MPD | 14.75 | 10,344 | 17,221 | 8.9 | 1.5 | 82 |
| 27.0 | PEG 600 | MPD | 77.5 | 77.5 | MPD | 18.0 | 11,164 | 19,285 | 7.5 | 0.92 | 94 |
| 82.0 | PEG 600 | MPD | 100.0 | 00.0 | | | 6,569 | 10,451 | 21.3 | 1.43 | 55 |
| 70.0 | PEG 600 | MPD | 100.0 | 00.0 | MPD | 2.10 | 7,634 | 12,034 | 19.0 | 1.27 | 70 |
| 50.0 | PEG 600 | MPD | 100.0 | 00.0 | MPD | 5.6 | 9,261 | 16,026 | 12.0 | 1.05 | 90 |
| 100.0 | PEG 800 | MPD | 100.0 | 00.0 | | | 1,572 | | 72.0 | 3.35 | −65 |
| 20.0 | PEG 1000 | TEPA | 80.0 | 80.0 | TEPA | 20.0 | 8,237 | 14,700 | 7.2 | 0.67 | 63 |
| 20.0 | PEG 1540 | TEPA | 80.0 | 80.0 | TEPA | 20.0 | 7,326 | 13,000 | 8.8 | 0.92 | 56 |

The foregoing examples and table clearly show that flexible properties are obtained from high molecular weight halohydrin ether-amine condensates of this invention. Factors influencing the physical properties of the cured resin are the molecular weight of the halohydrin from which the halohydrin ether-amine condensate is made, the particular amine from which the halohydrin ether-amine condensate is made, and the epoxide resin used. It is to be noted that mixtures of polyepoxides and monoepoxides as well as mixtures of the halohydrin ether-amine condensates of this invention and conventional curing agents can be used. The physical properties of the resins indicate that as the amount of long chain halohydrin ether-amine condensate in a condensate-conventional amine mixture is decreased, there is a corresponding increase in tensile strength, flexural strength, hardness and heat distortion of the resin. There is also a corresponding decrease in tensile elongation and impact strength.

Polyepoxides with which this invention is concerned are now well known and need not be discussed at length herein. The most useful of these epoxide resins is made from the reaction of a polyhydric phenol with epihalohydrin or glycerol dihalohydrin and a sufficient amount of caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy equivalency greater than one. Dihydric phenols that can be used for this purpose include bisphenol, resorcinol, catechol, hydroquinone, methyl resorcinol, 2,2-bis(4-hydroxyphenyl)butane, 4,4'-dihydroxybenzophenone, bis(4-hydroxyphenyl)-ethane, and 1,5-dihydroxy naphthalene. The preparation of polyepoxides from polyhydric phenols and epihalohydrin is described in U.S. Patents 2,467,171, 2,538,072, 2,582,985, 2,615,007 and 2,698,315, the proportion of the halohydrin (epichlorhydrin or glycerol dichlorhydrin) to dihydric phenol being at least about 1.1 to 1, up to around 10 to 1.

Higher melting point resins are made from the reaction of such resins with a further amount of dihydric phenol less than that equivalent to the epoxide content of the resin, as set forth in U.S. Patent 2,615,008. Halohydrins can be further exemplified by 3-chloro-1,2-epoxy butane, 3-bromo-1,2-epoxy hexane, 3-chloro-1,2-epoxy octane, and the like. Another group of polyepoxides is produced by the reaction of a polyhydric alcohol with epichlorhydrin or glycerol dichlorhydrin as disclosed in Zech Patent 2,581,464. Any of the various polyepoxides made from phenols, or alcohols, and epichlorhydrin as described can be used in accordance with this invention. It is preferred, however, to employ a polyepoxide having a weight per epoxide below one thousand.

In the curing of epoxide resins with the halohydrin ether-amine condensates of this invention virtually any amount of halohydrin ether-amine condensate can be used. Preferably, one equivalent of halohydrin ether-amine condensate is used per epoxy group, an equivalent of the halohydrin ether-amine condensate being the molecular weight per amino hydrogen, in other words, the average molecular weight divided by the number of active hydrogens. Generally, from about 0.5 to 1.5 equivalents of halohydrin ether-amine condensate are employed per epoxy group, desirably from 0.8 to 1.2 equivalents of halohydrin ether-amine condensate per epoxy group, depending upon the particular epoxide and the particular halohydrin ether-amine condensate. It will be understood that in the light of the teachings of the various facets of this invention variations and modifications will be evident to one skilled in the art. Thus, one can use various combinations of halohydrin ethers with amines to form a wide variety of polymeric, interpolymeric, copolymeric, and mixed polymeric systems depending upon the starting ingredients. For example, combinations of primary monoamines with polyamines may be used. In addition, combinations of these amines can be used with the mixtures of halohydrin ethers of mono, di or polyhydric alcohols. It will be apparent to one skilled in the art that the combinations possible herein are practically unlimited since there are numerous mathematical possibilities involved for these combinations. In another modification, as previously indicated, polyhydric alcohols can be reacted with less than stoichiometric amounts of epihalohydrin. In other words, a material such as glycol, glycerol, pentaerythritol, and so forth, can be reacted only with one mol of epichlorhydrin if desired.

It will be appreciated also that condensates of halohydrin ethers with all of the amines will not react in the same way with polyepoxides. Thus, variations will be made depending upon the particular amine used in the halohydrin ether-amine condensate. For instance, an epoxide resin cured with a halohydrin ether-amine condensate derived from metaxylylene diamine and the halohydrin ether of polyethylene glycol having a molecular weight of six hundred does not compare with a resin cured with the metaphenylene diamine condensate of a halohydrin ether derived from a glycol having a molecular weight of six hundred. Rather, the metaphenylene diamine condensate of a halohydrin ether of a glycol six hundred compares with the metaxylylene diamine condensate of the halohydrin ether of glycol four hundred. However, such ramifications, as well as other variations and modifications, will occur to those skilled in the art and are within the scope of the invention.

What is claimed is:

1. A process for the preparation of an insoluble, infusible resinous composition by reacting a glycidyl polyether of a polyhydric compound of the group consisting of polyhydric phenols and polyhydric alcohols, said glycidyl polyether having a 1,2-epoxy equivalency greater than one, with from 0.5 to 1.5 equivalents per epoxide group of a halohydrin ether-amine condensate as a cross-linking agent, wherein the halohydrin ether-amine condensate is prepared by reacting a nitrogen compound of the group consisting of ammonia and amines having at least two amino hydrogen atoms, with a halohydrin ether of an alcohol of the group consisting of alcohols and ethers having at least one primary alcoholic hydroxyl group and devoid of reactive groups other than alcoholic hydroxyl groups and wherein from 0.55 mol to 1 mol of nitrogen compound is used per halogen atom of the halohydrin ether, one mol of nitrogen compound per halogen atom being used with halohydrin ethers having more than two halogen atoms and from 0.55 to 1 mol of nitrogen compound being used only with mono and di halohydrin ethers, and by neutralizing the resulting hydrohalide salt to form the halohydrin ether-amine condensate.

2. The process of claim 1 wherein the glycidyl polyether has a weight per epoxide below one thousand, wherein the halohydrin ether-amine condensate is prepared by reacting a polyamine containing at least two amino hydrogen atoms with a dihalohydrin ether of a dihydric alcohol, and by neutralizing the resulting hydrohalide salt with sufficient alkali to combine with the halogen atoms of the dihalohydrin ether to form the halohydrin ether-amine condensate and wherein from 0.5 to 1.5 equivalent of halohydrin ether-amine condensate per epoxide group is used.

3. The process of claim 2 in which the halohydrin ether-amine condensate is the polymeric reaction product resulting from the reaction of less than one mol and more than 0.55 mol of amine for each halogen atom of the halohydrin ether.

4. A process for the preparation of a polymeric halohydrin ether-amine condensate which comprises, to form a polymeric amine-hydrohalide salt, reacting an amine containing at least two amino hydrogen atoms with a dihalohydrin ether of a dihydric alcohol in a ratio of from 0.55 mol to less than 1 mol of amine per halogen atom of the halohydrin ether, neutralizing the resulting hydrohalide salt to form the halohydrin ether-amine condensate.

5. The product resulting from the process of claim 1.

6. The product resulting from the process of claim 3.

7. The polymeric halohydrin ether-amine condensation product formed by reacting a dihalohydrin ether of a glycol with from 0.55 mol to less than 1 mol of an amine per halogen atom of the halohydrin ether to form a polymeric amine-hydrohalide salt, the amine being a polyamine containing at least two nitrogen atoms each bearing at least one hydrogen atom, and neutralizing the resulting hydrohalide salt to form the polymeric halohydrin ether-amine condensate.

8. A process for curing a glycidyl polyether of a polyhydric phenol, said glycidyl polyether having a 1,2-epoxy equivalency greater than one which comprises heat-reacting the glycidyl polyether with a halohydrin ether-amine condensate wherein the halohydrin ether-amine condensate is prepared by reacting ammonia with a polyhalohydrin ether of a polyhydric alcohol in the presence of an alkali and in a ratio of one mol of ammonia per halogen atom of the halohydrin ether.

9. A composition of matter comprising the halohydrin ether-amine condensate of claim 7 in admixture with from 0.03 to 6 parts by weight of an amine per part of halohydrin ether-amine condensate.

10. A process for curing a glycidyl polyether of a polyhydric compound of the group consisting of polyhydric phenols and polyhydric alcohols, said glycidyl polyether having a 1,2-epoxy equivalency greater than 1, reacting the glycidyl polyether with a polymeric halohydrin ether-amine condensate wherein the halohydrin ether-amine condensate is prepared by reacting an amine having at least two amino hydrogen atoms with a dihalohydrin ether of a dihydric alcohol in the presence of an alkali and in the ratio of from 0.55 mol to less than 1 mol of amine per halogen atom of the halohydrin ether.

References Cited in the file of this patent

UNITED STATES PATENTS 2,581,464    Zech                  Jan. 8, 1952
2,643,239    Shokal et al.         June 23, 1953

UNITED STATES PATENT OFFICE
CERTIFICATE OF CORRECTION

Patent No. 2,921,050            January 12, 1960

William J. Belanger

It is hereby certified that error appears in the printed specification of the above numbered patent requiring correction and that the said Letters Patent should read as corrected below.

Column 3, line 35, for "halohydrine" read -- halohydrin --; column 7, line 44, for "(on mol)" read -- (one mol) --; column 16, line 43, strike out "reacting the glycidyl polyether with" and insert instead -- which comprises heat-reacting the glycidyl polyether with --.

Signed and sealed this 7th day of June 1960.

(SEAL)
Attest:

KARL H. AXLINE
Attesting Officer

ROBERT C. WATSON
Commissioner of Patents